April 5, 1966 L. E. FOLK 3,244,344

CUTTING AND FORMING MECHANISM FOR BONDERS

Filed Dec. 30, 1963 2 Sheets-Sheet 1

INVENTOR.
Lee E. Folk

BY Mueller & Aichele

ATT'YS.

INVENTOR.
Lee E. Folk

BY Mueller & Aichele
ATT'YS.

United States Patent Office 3,244,344

Patented Apr. 5, 1966

3,244,344
CUTTING AND FORMING MECHANISM FOR BONDERS

Lee E. Folk, Phoenix, Ariz., assignor to Motorola, Inc., Franklin Park, Ill., a corporation of Illinois Filed Dec. 30, 1963, Ser. No. 334,144
3 Claims. (Cl. 228—13)

This invention relates to wire bonders, and particularly to bonders of a stitch bonding type which are particularly useful in the manufacture of integrated circuits.

The active parts of semiconductor devices and integrated circuits are so small that terminals or leads large enough for making external connections cannot be attached directly to the active semiconductor regions. Consequently, it has become common in the semiconductor industry to interconnect the active regions and appropriate terminals or leads by thermocompression bondiing of fine metal wire. As the name thermocompression indicates, bonding of the wire is accomplished by a combination of heat and pressure. Several specific bonding techniques have been developed, one of which is known in the art as stitch bonding.

In stitch bonding, the tool used to apply pressure to the wire is hollow. The wire is fed through the hollow tool and is presser against the area to which it is to be bonded by an edge at the end of the tool where the wire emerges. As many bonds as desired may be made before the wire is severed, and the analogy to stitching is apparent.

The cutting of the wire has been as critical as the actual bonding. The wire must be cut such that the wire-end emerging from the tool is bent and crosses over the bonding edge at the end of the tool. In known stitch bonders the bending and cutting steps have been done together by a cutter cooperating with the bonding edge. The cutter severs the wire, and one of the cutter blades engages the wire at the bonding edge and bends it over that edge to form a bent tail at the end of the wire. It has been found that the cutting mechanism will not function properly unless the cutter engages the wire in precisely the right place relative to the bonding edge. With usage the cutter can easily drift away from its correct position enough to cause malfunctioning. Consequently, the cutting mechanism has been a source of trouble in stitch bonders.

An object of this invention is to provide a wire cuttting mechanism for stitch bonders which does not require close tolerances on the position of cutters relative to the bonding tool.

A feature of the invention is a cutting mechanism which operates independently of the bonding tool of a stitch bonder, and which includes blades designed to cut the wire and also bend it in a manner which minimizes the chance for malfunctioning in the cutting operation.

Figure 3A:
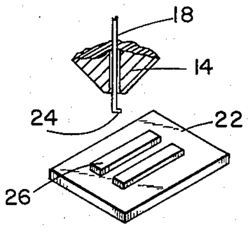
Figure 3B:
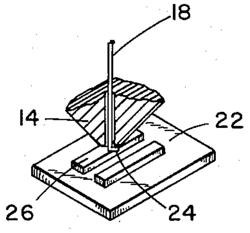
Figure 3C:
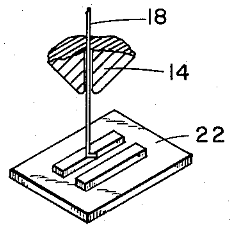
Figure 4A:
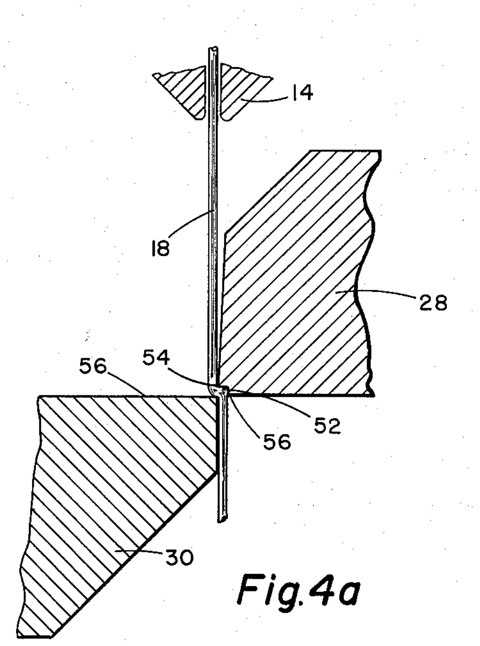
Figure 4B:
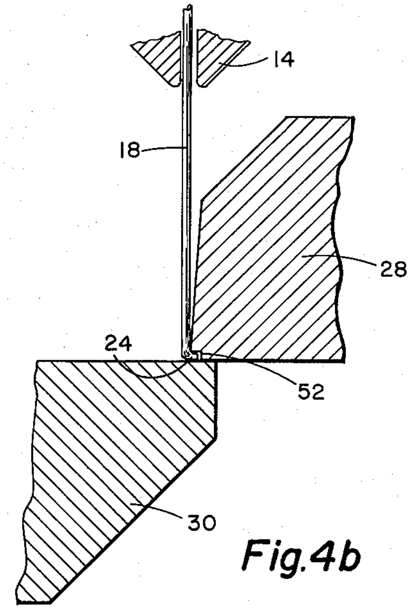

FIGS. 3*a* through 3*c* are a series of views showing the different positions of the bonding tool in making a bond;

FIG. 4*a* is a greatly enlarged sectional view of the cutting blades as they bend the wire before cutting it; and FIG. 4*b* is a sectional view similar to FIG. 4*a* but showing the condition of the wire and the position of the blades just after the wire has been cut.

In accordance with the invention, a stitch bonder is provided with a pair of cutting blades which sever the wire well below the tip of the bonding tool in its raised position. The edge of one of the blades is recessed such that when the blades come together on the wire, they bend it into the recess. As the blades close further they cut the wire next to the blend, leaving a bend-over wire-end which can be picked up by the bonding tool when it is lowered. The tool can then press the bent-over wire-end against a contact, terminal, or other area where a bond is required. Since the bending and cutting is done by a separate mechanism independent from the bonding tool, it is not necessary to have strict tolerances on the position of the cutter and the chance of malfunctioning is reduced considerably.

Figure 1:
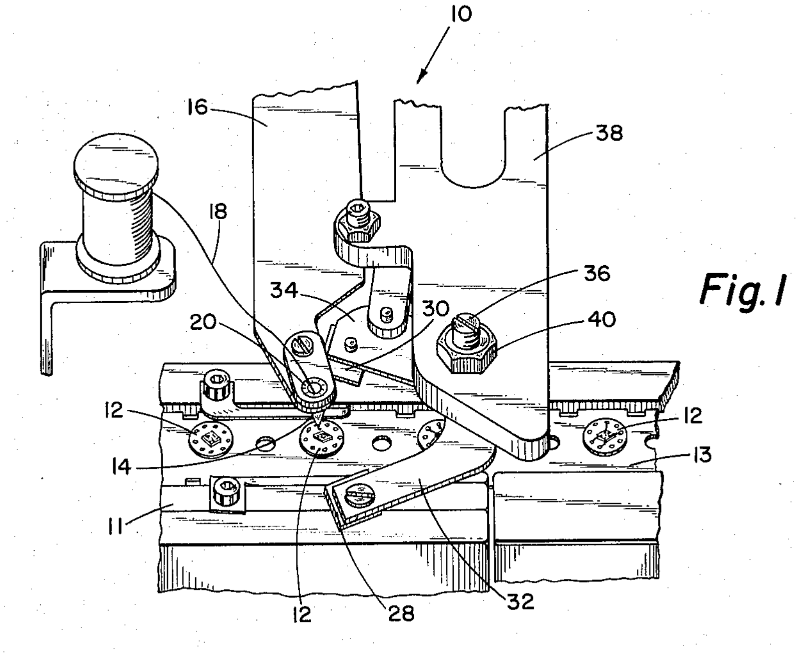
FIG. 1 is a fragmentary view showing only that part of a stitch bonder where the bonding and cutting takes place.

FIG. 1 shows a bonding and cutting assembly 10 in accordance with the invention as it appears over a track structure 11 in which integrated circuit assemblies 12 are carried. The bonding and cutting assembly 10 is only part of a complete bonding machine, but since the rest of the machine is not directly related to the invention it is not shown herein. The assembly 10 may be attached to a micromanipulator of the type described and claimed in U.S. Patent No. 3,051,026 to H. da Costa, and the mechanism for feeding the assemblies 12 to the bonding area may be of the type described and claimed in U.S. Patent No. 3,102,331 to H. da Costa.

The assemblies 12 ride on a strip-like carrier 13 which is moved incrementally from left to right along the track structure 11 as viewed in FIG. 1. This step-by-step movement brings each successive assembly 12 to a bonding position underneath a bonding tool 14 which is supported over the track structure 11 by an arm 16. The bonding tool 14 is a small hollow needle. The wire 18 which is to be bonded to the assemblies is fed into a beveled recess-opening 20 at the top of the bonding tool, then passes through the hollow interior of the needle-like tool and emerges from its bottom end as shown in FIG. 1. A bond is made by lowering the arm 16 to bring the tool 14 down on the assembly 12 under it.

The functioning of the tool 14 in making a bond is shown more clearly in FIGS. 3*a* through 3*c*. The tool 14 is shown in FIG. 3*a* above a semiconductor element 22 like the semiconductor element of one of the assemblies 12 in FIG. 1. Although the element 22 of FIG. 3 is simpler in configuration than the semiconductor element of an integrated circuit, it serves to illustrate the bonding technique. From FIG. 3*a* it may be seen that the lower end 24 of the wire 18 is bent over at a right angle. The wire may be pulled back into the tool to engage the tail 24 with the edge at the exit end of the tool. Thus, when the tool 14 is brought down on the semiconductor element 2 as shown in FIG. 3*b*, the edge of the tool at its exit end presses the bent-over tail 24 against a metal contact 26 on the semiconductor element 22. The semiconductor element is heated by a heater included in the track structure 11 (not shown), and the combination of this heat and the pressure of the bonding tool on the wire-end 24 bonds the wire-end to the metal contact 26. The tool 14 is then raised and moves up along the wire 18 as shown in FIG. 3*c*.

After the wire-end 24 has been bonded in the manner just described, it is possible to make several additional bonds before the wire is cut. The tool 14 is simply manipulated to the points where bonds are required, and lowered to press the wire against contacts or other metal regions at those points. After the desired number of bonds have been made, the wire is cut, and in the cutting operation a new bent-over wire-end 24 must be formed.

In the assembly of FIG. 1, the cutter is comprised of a top blade 28 and a bottom blade 30 which are carried respectively on scissor-like arms 32 and 34. The arms 32 and 34 pivot about a pin 36 which is fastened to another arm 38 by means of a nut 40. The arms 16 and 18 are connected to the positioner element of a micromanipulator such as that described in U.S. Patent No. 3,051,126 referred to previously.

Figure 2:
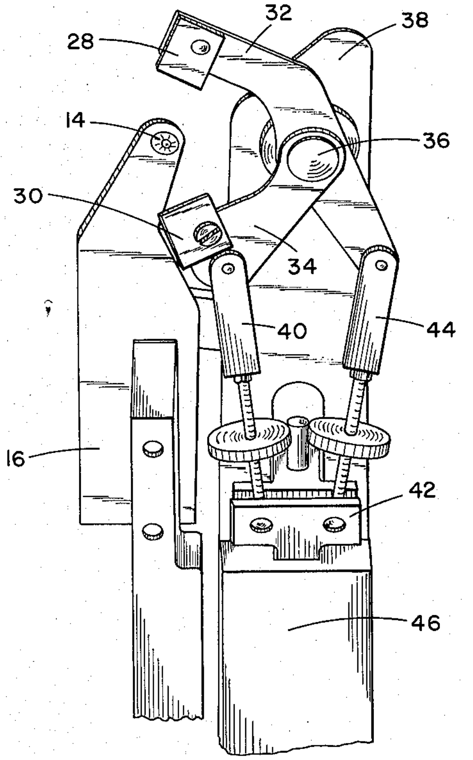
FIG. 2 is a bottom view of the bonding and cutting apparatus of FIG. 1.

The cutting and bonding assembly of FIG. 1 is shown from the bottom in FIG. 2, and the mechanism of the cutter can be seen more clearly in the latter view. The arm 34 which carries blade 30 is driven by an adjustable linkage 40 which in turn is connected to an actuator 42, part of which is shown projecting from a housing 46. The actuator 42 also operates another adjustable linkage 44 which is connected to an extension of the arm 32 which carries the other blade 28. The actuator 42 is driven longitudinally in a forward stroke and a reverse stroke by means of an air-operated cylinder which is not shown. When the actuator 42 is driven in the forward stroke (upward as viewed in FIG. 2), the arms 32 and 34 pivot about pin 36 causing the blades 28 and 30 to close on the wire-end which emerges from the bottom of the bonding tool 14. This bends the wire and cuts it, and the blades are then opened by operation of the air cylinder to drive the actuator 42 in its reverse stroke.

The action of the blades 28 and 30 on the wire is shown best by the schematic cross sectional views of FIGS. 4*a* and 4*b*. FIG. 4*a* shows the blades 28 and 30 as they close on the wire 18 and bend it. The top blade 28 has a small recess right at its cutting edge such that there is a shoulder 52 set back from the front edge 54 of the blade. The front edge 54 engages the wire and bends it over the top surface 56 of the lower blade 30, at the same time causing the wire to bend into the recess behind the bending edge 54. Then as the blades close further, the cutting edge 56 at the bottom of the shoulder 52 severs the wire by shearing action with the top surface 56 of the lower blade. The condition of the wire after this shearing is shown in FIG. 4*b*. The wire 18 has a small tail 24 bent into the recess of the top blade as shown. Thus, when the tool 14 is brought down to make a bond in the manner described in connection with FIGS. 3*a*–3*c*, the edge of the tool presses the tail 24 against the area to which the wire is to be bonded.

The distance from the bending edge 54 to the shoulder 52 (i.e., the width of the recess), determines the length of the tail 24, and since this dimension of the blade can be controlled accurately it is possible to control the length of the tail more accurately than can be done if the wire is sheared against the tip of the tool. From FIGS. 4*a* and 4*b* it is apparent that the action of the bending and cutting blades 28 and 30 is independent from the bonding tool since the blades cut the wire well below the tip of the tool 14 in its raised position. It is not necessary to have close tolerances on the position of the blades 28 and 30 relative to the tool 14. In fact, the blades can be offset laterally or vertically from the position shown without causing malfunctioning. Another advantage is that there is no wearing of the bonding edge from the cutting action. The recessing of one of the blades to accomplish the bending and cutting in a single motion of the blades is a simple and yet effective way of preparing the wire for a new bond.

I claim:

1. In a bonding apparatus having a bonding tube for bonding wire to an object by feeding the wire through said tube and pressing a protruding portion of the wire against the object with an edge of the tube where the wire emerges from the tube, the combination with said bonding tube in said apparatus of a mechanism for both bending and cutting such protruding wire portions at a place spaced from said tube edge, said mechanism comprising a first cutter member having a bending edge and a first cutting edge with a recess in said first cutter member between said edges and a shearing surface adjoining said first cutting edge, a second cutter member having a second cutting edge and a shearing surface adjoining said second cutting edge, means movably mounting said cutter members at a place spaced longitudinally from said tube for allowing movement of said members without engaging said tube between a closed position in which said shearing surfaces oppose each other face-to-face and an open position, said bending edge protruding ahead of said first cutting edge enough to allow said bending edge to bend a predetermined length of a protruding wire portion about said first cutting edge and into said recess before said cutting edges sever the wire at the end of said length in the closing of said cutter members, and actuating means for opening and closing said cutter members.

2. In a bonding apparatus having a bonding tube for bonding wire to an object by feeding the wire through said tube and pressing a protruding portion of the wire against the object with an edge of the tube where the wire emerges, the combination with said bonding tube in said apparatus of a mechanism for both bending and cutting such protruding wire portions at a place spaced from said tube edge, said mechanism comprising a first cutter member having a bending edge and a first cutting edge with a recess in said first cutter member between said edges and a shearing surface adjoining said first cutting edge, a second cutter member having a second cutting edge and a shearing surface adjoining said second cutting edge, means movably mounting said cutter members at a place spaced longitudinally from said tube for allowing movement of said members without engaging said tube between a closed position in which said shearing surfaces contact each other face-to-face and an open position in which said cutting edges are separated, said bending edge being spaced by the extent of said recess from said shearing surfaces in said closed position of said cutter members and protruding ahead of said first cutting edge for allowing said bending edge to bend a protruding wire portion about said first cutting edge and into said recess before said cutting edges sever the wire in the closing of said cutter members, and means for actuating said mounting means to close and open said cutter members.

3. In a bonding apparatus for bonding wire to portions of objects, the combination of a bonding tool having an opening through the same for receiving and guiding wire, means for feeding continuous wire through said opening of said tool, said tool having an edge at the tip thereof for pressing a protruding wire portion against an object to form a bond between the wire and the object, means movably mounting said bonding tool in the apparatus, a pair of cutter blades, movable means mounting said cutter blades in the apparatus in an open position with one blade to each side of the exit end of said bonding tool but spaced longitudinally from the tip of said tool, driving means operatively connected to said mounting means for actuating the same to close and open said blades, one of said blades having a bending edge and a cutting edge with a recess between the same, and the other of said blades having a cutting edge, said bending edge being positioned by said mounting means to bend a wire protruding from said tool over said cutting edge of said other blade, and said cutting edges being positioned by said mounting means to sever the wire a predetermined distance from the bend in order to leave a bent end on said wire.

References Cited by the Examiner

UNITED STATES PATENTS

| | | | |
|---|---|---|---|
| 3,168,884 | 2/1965 | Williams | 72—386 |
| 3,186,446 | 6/1965 | Hunt | 228—44 |

WHITMORE A. WILTZ, *Primary Examiner*.

M. L. FAIGUS, *Examiner*.